(12) United States Patent
Bauer et al.

(10) Patent No.: US 7,824,158 B2
(45) Date of Patent: Nov. 2, 2010

(54) BIMATERIAL TURBINE BLADE DAMPER

(75) Inventors: Randall Charles Bauer, Loveland, OH (US); D. Keith Patrick, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 770 days.

(21) Appl. No.: 11/767,548

(22) Filed: Jun. 25, 2007

(65) Prior Publication Data
US 2008/0313899 A1 Dec. 25, 2008

(51) Int. Cl.
*F01D 5/26* (2006.01)
(52) U.S. Cl. .................. 416/232; 416/500; 416/241 R
(58) Field of Classification Search ............. 416/146 R, 416/62, 224, 229 A, 500, 232, 241 R; 415/119; 29/889.2
See application file for complete search history.

(56) References Cited

U.S. PATENT DOCUMENTS

| | | | |
|---|---|---|---|
| 2,460,351 A | 2/1949 | Hoffman et al. | |
| 2,689,107 A | 9/1954 | Odegaard | |
| 2,809,802 A | 10/1957 | Suits | |
| 2,828,941 A | 4/1958 | Foley | |
| 2,920,868 A | 1/1960 | Ackerman et al. | |
| 2,984,453 A | 5/1961 | Heymann | |
| 3,027,138 A | 3/1962 | Howell et al. | |
| 3,973,874 A | 8/1976 | Corsmeier et al. | |
| 4,188,171 A | 2/1980 | Baskin | |
| 4,437,810 A | 3/1984 | Pearce | |
| 4,441,859 A | 4/1984 | Sadler | |
| 4,484,859 A | 11/1984 | Pask et al. | |
| 4,526,512 A | 7/1985 | Hook | |
| 5,165,860 A | 11/1992 | Stoner et al. | |
| 5,232,344 A | 8/1993 | El-Aini | |
| 5,356,264 A * | 10/1994 | Watson et al. ............... | 415/119 |
| 5,407,321 A | 4/1995 | Rimkunas et al. | |
| 5,820,343 A | 10/1998 | Kraft et al. | |
| 6,155,789 A | 12/2000 | Mannava et al. | |
| 6,685,435 B2 * | 2/2004 | Davis et al. .................. | 416/230 |
| 6,929,451 B2 | 8/2005 | Gregg et al. | |
| 7,270,517 B2 * | 9/2007 | Garner ........................ | 416/145 |
| 7,300,256 B2 * | 11/2007 | Masserey et al. ............ | 416/230 |
| 7,413,405 B2 * | 8/2008 | Busbey et al. .............. | 416/96 A |
| 2006/0280606 A1 | 12/2006 | Busbey et al. | |

OTHER PUBLICATIONS

U.S. Appl. No. 11/733,252, filed Apr. 10, 2007, Bauer et al.

\* cited by examiner

*Primary Examiner*—Ninh H Nguyen
(74) *Attorney, Agent, or Firm*—William S. Andes; Francis L. Conte

(57) ABSTRACT

A turbine blade damper includes an outer part for damping vibration of the blade airfoil and a supporting inner part. The two parts are formed of different materials for the different performance required thereof in the blade.

27 Claims, 5 Drawing Sheets ated in FIG. 1 is an exemplary turbine rotor blade 10,
BIMATERIAL TURBINE BLADE DAMPER The U.S. Government may have certain rights in this invention pursuant to contract number contract N00019-04-C-0093 awarded by the U.S. Department of the Navy.

BACKGROUND OF THE INVENTION

The present invention relates generally to gas turbine engines, and, more specifically, to blade damping therein.

In a gas turbine engine, air is pressurized in a compressor and mixed with fuel in a combustor for generating hot combustion gases. Energy is extracted from the gases in a high pressure turbine (HPT) which powers the compressor. Additional energy is extracted in a low pressure turbine (LPT) for powering a fan in a turbofan aircraft engine application, or for powering an output drive shaft for marine and industrial (M&I) applications.

Each turbine stage includes a row of turbine rotor blades extending radially outwardly from a supporting rotor disk. During operation, the turbine blades extract energy from the hot combustion gases and are subject to considerable pressure and centrifugal loads, and operate at elevated temperature.

The blades are typically hollow and include internal cooling circuits through which a portion of pressurized air bled from the compressor is circulated for cooling the individual blades against the heat loads from the combustion gases.

The turbine blades typically increase in size and length in the successive stages from the combustor for maximizing efficiency of energy extraction as the pressure in the combustion gases decreases in the downstream direction. The turbine blades are subject to vibratory excitation forces due to the aerodynamic and centrifugal loads and behave differently due to the different sizes and configurations of the blades, with different modes of vibration occurring at different resonant frequencies.

Vibration damping may be effected where desired using under platform vibration dampers, or internal vibration dampers installed inside the individual blades.

Internal vibration dampers typically extend the length of the turbine blade and are mounted inside the supporting dovetail and are cantilevered freely inside the airfoil.

Each damper is typically a slender rod having a small lean so that centrifugal forces load the damper radially outwardly against corresponding internal supporting lands inside the airfoil. Frictional vibration between the damper and the airfoil dissipates excitation forces and effectively dampens blade vibration.

However, frictional damping is subject to wear between the damper and the airfoil, and should be minimized. Yet, the damper itself is subject to substantial centrifugal loads during operation and experiences corresponding tensile and bending stresses along its length.

Blade life is a paramount design objective, and with the introduction of an internal damper, the life of the damper itself affects the life of the blade. The damper should therefore be formed of a material having sufficiently high strength for effecting long low cycle fatigue (LCF) life, long high cycle fatigue (HCF) life, and long rupture life for the damper. These life factors are typically controlled by the highest steady state stress portions of the damper, which is typically in its supporting portion.

In contrast, the outer portion of the damper subject to frictional vibration with the airfoil experiences substantially lower stresses during operation, yet is subject to friction wear.

Standard design practice for introducing blade vibration dampers typically requires a compromise between the wear and strength performance of the damper.

Accordingly, it is desired to provide a turbine blade damper having improved wear resistance in combination with high strength.

BRIEF DESCRIPTION OF THE INVENTION

A turbine blade damper includes an outer part for damping vibration of the blade airfoil and a supporting inner part. The two parts are formed of different materials for the different performance required thereof in the blade.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
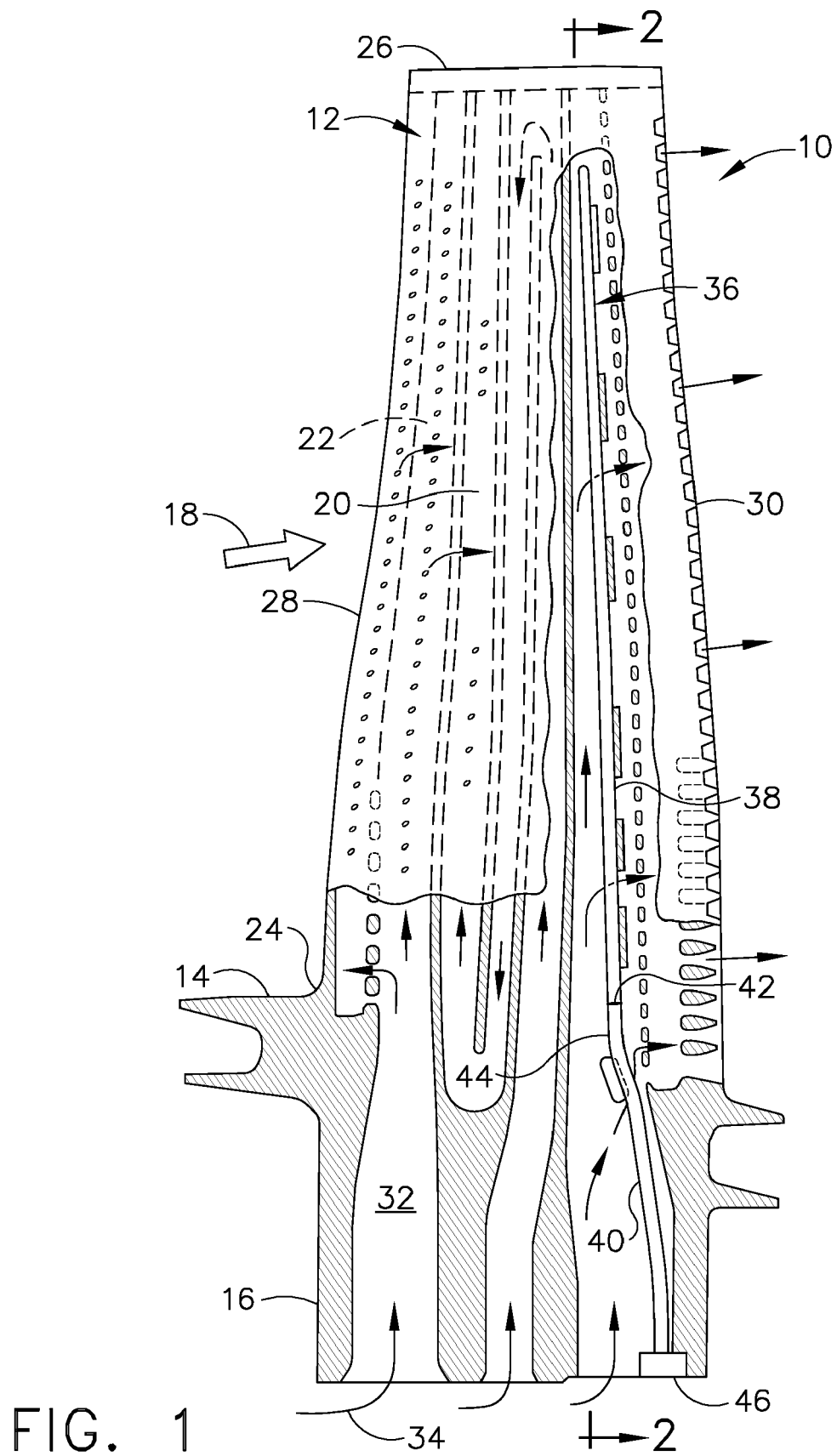
FIG. 1 is a partly sectional elevational view of an exemplary gas turbine engine turbine rotor blade having an internal damper therein.

Illustrated in FIG. 1 is an exemplary turbine rotor blade 10, such as the first stage turbine blade in the LPT of a gas turbine engine. The blade includes an airfoil 12, platform 14, and dovetail 16 formed in a unitary casting.

The dovetail 16 mounts the blade radially to the outer perimeter of a supporting rotor disk (not shown), and combustion gases 18 flow around the airfoil 12 during operation to provide energy for powering the rotor disk.

The airfoil 12 has a generally concave pressure side 20 and a circumferentially opposite, generally convex suction side 22 extending longitudinally or radially from a root 24 at the platform 14 to a radially outer tip 26. The two sides extend axially in chord between opposite leading and trailing edges 28, 30 and are conventionally configured for extracting energy from the combustion gases during operation.

The turbine blade is hollow and includes an internal cooling circuit 32 which may have any conventional configuration typically defined by radial partitions bridging the opposite sides of the airfoil and spaced chordally apart forming the exemplary seven radial flow passages therein.

The flow passages are arranged in suitable circuits such as dedicated impingement cooling circuits for the leading and trailing edges of the airfoil, and a three pass serpentine cooling circuit in the midchord region of the airfoil.

Three of the seven flow passages extend through the platform and dovetail to provide three corresponding inlets in the base of the dovetail for receiving pressurized cooling air 34 bled from the compressor (not shown). The airfoil includes various film cooling and trailing edge holes around the outer surface thereof which discharge the spent internal cooling air in a conventional manner during operation.

Disposed in the penultimate, or sixth, flow passage in the blade 10 is an elongate, internal stick damper 36. The damper 36 is long and slender and extends in length from the base of the dovetail 16 to just below the airfoil tip 26.

The damper 36 is configured to conform with the shape of the sixth flow passage in which it is mounted with a slight radial inclination or lean so that centrifugal loads on the damper load the damper in friction against corresponding portions or lands of the airfoil for effecting internal frictional damping during operation.

Frictional dampers are well known and utilize vibratory motion during operation to frictionally dissipate vibratory excitation energy to dampen the blade airfoil.

However, the damper itself must be suitably mounted inside the turbine blade and is subject to substantial centrifugal loads during operation which effect tensile and bending loads in the damper along the radial length thereof, subject to the particular configuration of the damper and blade.

The damper 36 itself may be otherwise conventional and is modified herein from a single material composition to include different material compositions specifically configured to match the different operating requirements of the damper over its length.

In a basic configuration, the damper 36 includes an elongate outer part or rod 38 sized in length to extend inside the airfoil 12 from the platform 14 to a suitable elevation closely adjacent to the airfoil tip.

The damper also includes a supporting inner part or shank 40 suitably affixed to a proximal end of the outer part 38 and extending therebelow for being retained in the blade below the platform 14.

The two parts 38,40 of the single damper 36 are specifically formed of different materials for effecting frictional damping inside the airfoil 12 and tensile support below the platform.

The damper outer part 38 is longitudinally elongate and slender to fit inside the airfoil and includes a proximal end affixed to the distal end of the inner part 40 at a corresponding integral joint 42 therewith. The joint 42 is specifically located inside the blade to differentiate the upper part 38 from the supporting damper inner part 40 which is suitably mounted in the blade for carrying the substantial centrifugal loads generated in the damper during operation.

Forming the damper with different material compositions improves the ability to match different parts of the damper to the different requirements and functions thereof inside the blade. In particular, the damper outer part 38 is formed of a first material having a substantially greater frictional wear resistance capability than the different second material forming the damper inner part 40.

Correspondingly, the second material forming the damper inner part 40 preferably has a substantially greater tensile strength than that of the first material of the damper outer part 38. And, the intervening joint 42 determines the transition location within the damper itself for the different materials and the different performance required therefor.

The exemplary damper illustrated in FIG. 1 is mounted from its radially inner end to the blade dovetail. The damper inner part 40 defines a supporting shank extending radially inwardly through the platform and dovetail to reach the base of the dovetail. And, the elongate damper outer part or rod 38 extends radially outwardly from the platform to just short of the airfoil tip as desired for damping effectiveness.

The centrifugal loads generated in the damper are carried radially inwardly through the outer part and into the inner part before reaching the dovetail itself, which substantially increases the tensile loads in the inner part 40.

Furthermore, the damper 36 is typically nonlinear and curves or bends to match the three dimensional (3D) configuration of the sixth flow passage in which the damper is mounted. The curved configuration of the damper includes an exemplary bend 44 and additionally introduces bending stresses typically in the damper inner part 40 along the bend.

In contrast, the damper outer part 38 is generally straight radially outwardly above the platform. The outer part 38 carries substantially lower loads during operation and laterally engages the supporting lands for frictional contact.

Accordingly, the damper outer part 38 may be formed of a first material having maximum frictional wear resistance independent of the associated tensile strength thereof.

And, the damper inner part 40 may be formed of a different second material having maximum tensile strength independent of wear resistance, with the second material being substantially greater in tensile strength than that of the first material of the outer part 38.

In this way, the material composition of the damper may be preferentially matched to the operating environment and loads which are different on the different portions of the damper.

The first material forming the damper outer part 38 is selected primarily for its enhanced wear resistance capability and is therefore different than the first material, and may be formed of a cobalt based metal superalloy such as MAR-M-509 (trademark) commercially available from Cannon-Muskegon, Muskegon, Mich.

The second material forming the damper inner part 40 may be formed of a nickel based metal superalloy such as Rene 80 or Rene N5 (trademarks), available from General Electric Company, Fairfield, Conn., which have enhanced strength for LCF, HCF, and rupture life at the elevated temperatures experienced by the turbine rotor blade.

The first material lacks the tensile strength of the second material, whereas the second material lacks the wear resistance of the first material.

These two different materials, or bimetals, in the same damper component are used to match the different metals and their properties with the different operating requirements of the damper within the turbine blade.

Accordingly, the strength and useful life of the damper may be maximized while correspondingly maximizing the wear resistance and life thereof for the turbine blade damper application.

In the damper 36 illustrated in FIG. 1, the outer and inner parts 38,40 are coextensive with each other with a substantially constant circular cross section terminating in a suitable mounting block or base 46 at the proximal end of the inner part, which is received in a complementary socket in the base of the dovetail.

To match the profile of the twisting airfoil blade, the damper inner part 40 bends laterally from the outer part 38 below the joint 42 to include the exemplary bend 44 located directly adjacent a supporting rib in the plane of the platform.

The damper inner part 40 extends the full height of the dovetail and platform, with the joint 42 being disposed near the platform just above the bend 44 closer to the mounting block 46 than to the opposite distal end of the longer outer part 38 which extends over the greater length of the airfoil terminating closely adjacent to the airfoil tip.

In this way, the damper outer part 38 may be substantially straight over its full extent inside the airfoil 12, and the damper inner part 40 bends and curves as required to thread through the platform and dovetail to the mounting block 46. And, the joint 42 affixing the two damper parts together is located above the highly loaded inner portion of the damper attached to the base of the airfoil.

Figure 2:
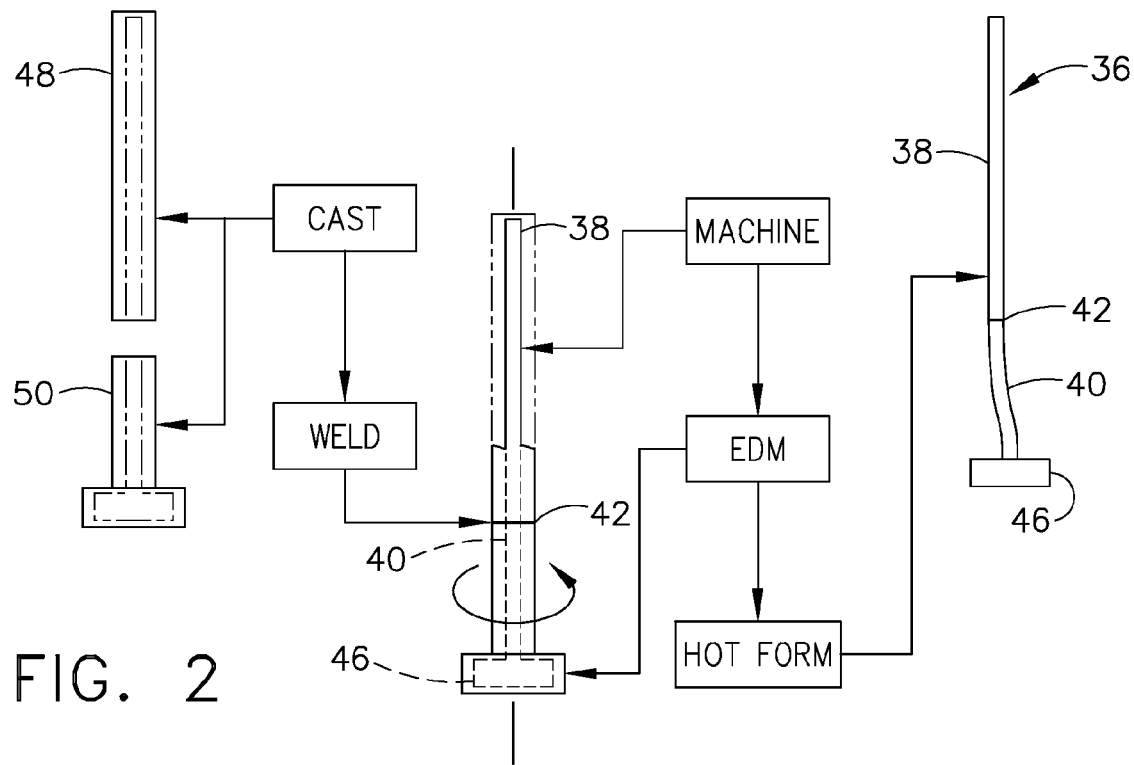
FIG. 2 is a schematic representation for making the damper in FIG. 1 in accordance with one embodiment.

FIG. 2 illustrates schematically an exemplary method of making the bimetallic damper 36. The outer and inner parts 38,40 are separately formed of their corresponding first and second materials. For example, an outer casting 48 of the first material is firstly made in oversize to subsequently form the outer part 38. And, an inner casting 50 is first formed in oversize to subsequently form the inner part 40.

The two castings 48,50 are suitably machined at corresponding end faces so that the two castings may be joined coextensively end-to-end and suitably bonded together to form the joint 42. Possible joining processes include, but not limited to: laser welding; inertia welding; translation friction welding; or brazing to form a strong joint 42 with a minimum heat affected zone.

The welded castings may then undergo suitable machining to remove therefrom the excess material to form the resulting damper 36. For example, conventional centerless, high speed precision grinding may be used to spin the joined castings around their longitudinal or axial centerline axis and remove the excess material from the rod portion thereof. Conventional electrical discharge machining (EDM) may then be used to remove the excess material from the proximal end of the casting to produce the final mounting block 46.

The straight machined casting may then be suitably hot formed to bend in particular the damper inner part 40 to the required 3D configuration to match the corresponding profile of the blade passage in which the damper is mounted. In hot forming, the machined casting is heated to its anneal temperature in a suitable molding process for reshaping the damper to the required 3D shape with minimal residual stresses therein.

Any conventional method of manufacture may be used for forming the bimaterial damper, but suitably modified for effecting the different materials required. Powder metal forming may also be used for more directly forming the bimetallic damper and minimizing machining or other process steps.

And, the damper itself may have any suitable form in which two, or more, different material compositions are used as desired for preferentially matching material performance with the different operating environments inside the specific turbine blade.

Figure 3:
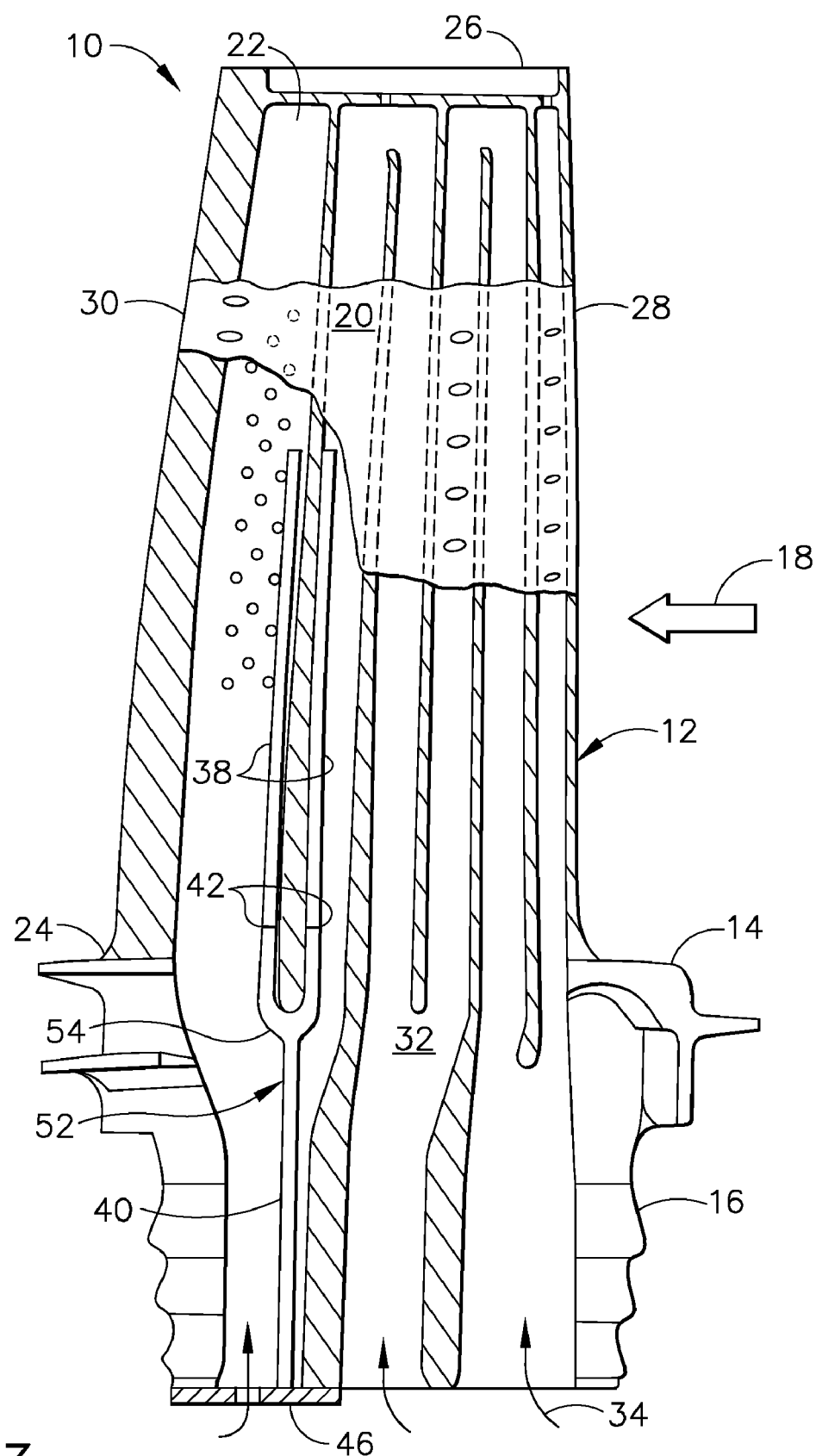
FIG. 3 is a partly sectional elevational view of a turbine rotor blade having an internal damper in accordance with another embodiment.

FIG. 3 illustrates another configuration of the damper, designated 52. In this embodiment, the damper 52 includes a pair of parallel outer parts or rods 38 disposed inside the airfoil and affixed to a common inner part or shank 40 extending through the platform and dovetail.

The inner part 40 includes a U-shaped bend or fork 54 which is affixed to the pair of outer parts 38 at corresponding joints 42 which separate the second material of the inner part 40 from the different first material common to the two outer parts 38. Another form of the mounting block 46 is affixed to the proximal end of the shank 40 and supports the damper to the base of the dovetail.

In the FIG. 3 embodiment, the damper 52 includes the common shank or stem 40 and the integral fork 54 both defining the inner part of the damper which in turn supports the two outer rods 38 at the corresponding joints 42.

The two rods 38 are generally straight and have a small lean to frictionally engage corresponding portions of the airfoil when loaded under centrifugal force. The fork 54 of the damper bridges and is trapped at the bottom of a corresponding partition of the airfoil.

Since the fork and shank 40 carry the substantial centrifugal loads generated by the damper during operation they are subject to substantial centrifugal stresses for which the high strength second material is best utilized for maximizing damper life. Correspondingly, the less loaded outer rods 38 are formed of the wear resistant first material for maximizing frictional damping performance thereof with minimal wear.

Figure 4:
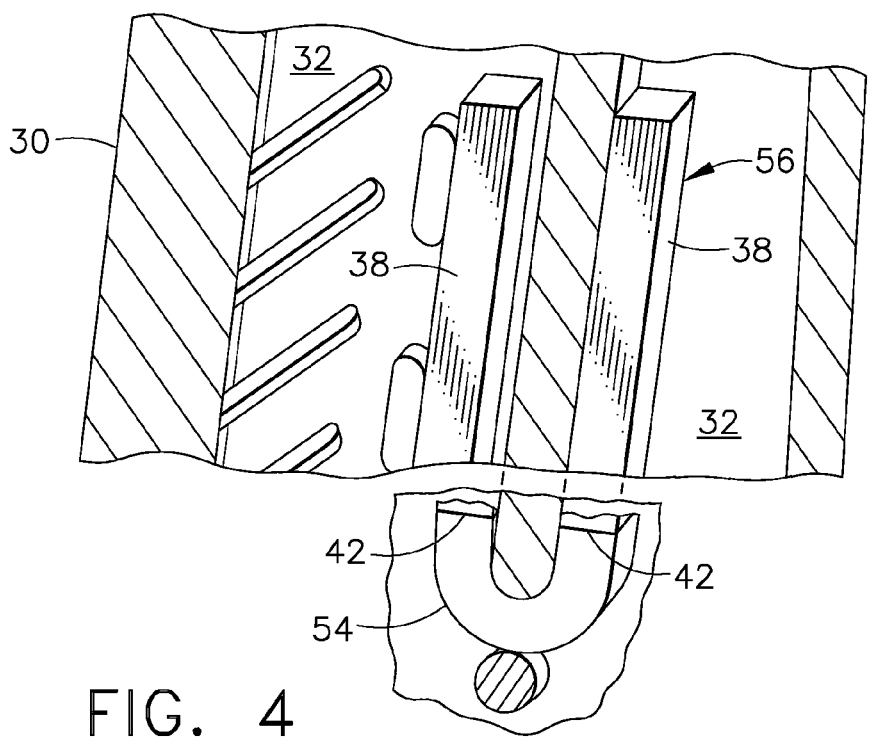
FIG. 4 is an enlarged portion of the airfoil illustrated in FIG. 3 having an internal damper in accordance with another embodiment.

FIG. 4 illustrates yet another embodiment of the damper, designated 56 again having a pair of the outer parts or rods 38 joined to a common fork 54 at the corresponding joints 42. In this embodiment, the fork 54 has the generally U-shaped configuration, and is stemless. The fork 54 may therefore be trapped between one of the airfoil partitions thereabove and a suitable pin disposed therebelow.

In the similar embodiments illustrated in FIGS. 3 and 4, the corresponding forks 54 preferably have straight legs joined to the straight outer rods 38 at the corresponding joints 42 which separate the different first and second materials between the outer and inner parts of the dampers.

Although the load paths are different through the different dampers illustrated in FIGS. 1, 3, and 4 the corresponding inner parts of the dampers carry the loads differently and are preferentially formed of the high strength second material described above, and the corresponding outer parts of the dampers are formed of the different wear resistant first material.

Figure 5:
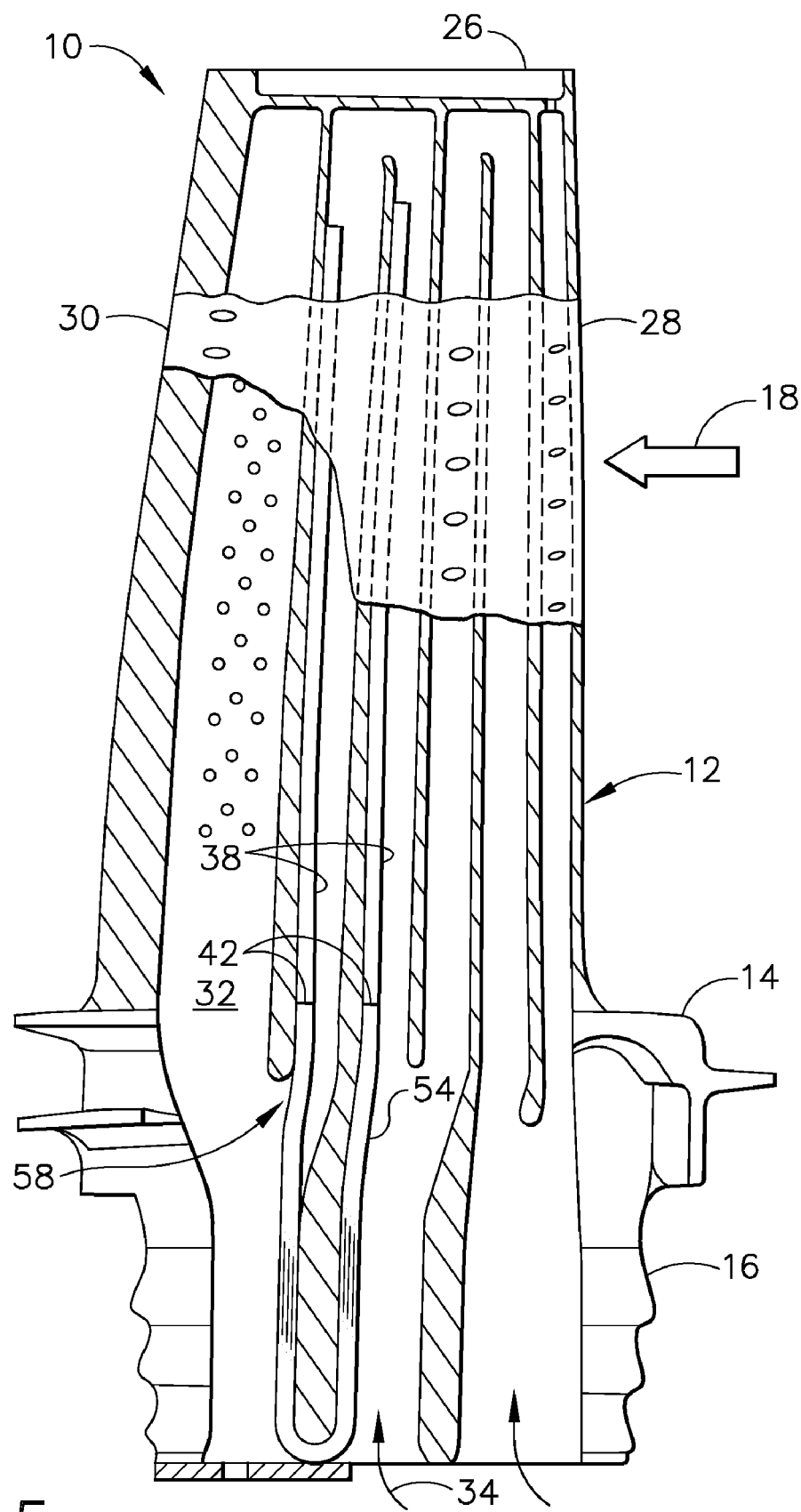
FIG. 5 is a partly sectional elevational view of the airfoil illustrated in FIG. 3 having a damper in accordance with another embodiment.

FIG. 5 illustrates yet another embodiment of the damper, designated 58, again having a pair of the outer parts 38 joined to the stemless fork 54. In this embodiment, the joints 42 are located near the platform 14, and the fork 54 extends over the full height of the platform and dovetail to the base of the dovetail.

The fork 54 is trapped around one of the blade partitions which extends to the dovetail base, and the centrifugal loads from the fork are carried through that partition into the dovetail during operation.

The joints 42 are located at the root of the airfoil in relatively low load regions so that the wear resistant first material may be used in the outer rods 38 above the joints 42, and the high strength second material may be used for the damper inner part below the platform and over the full height of the dovetail.

Figure 6:
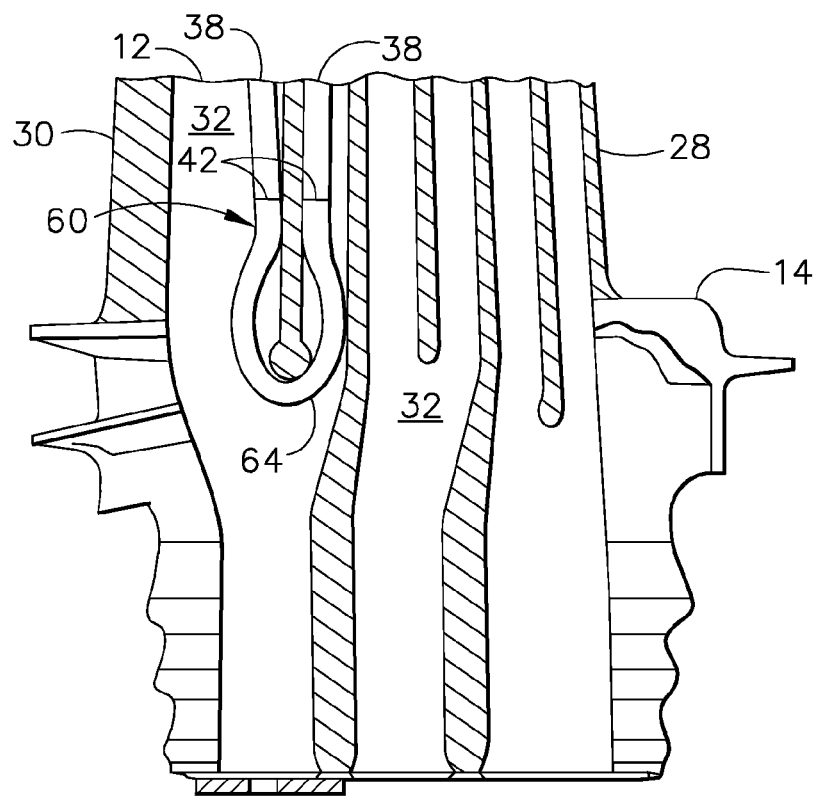
FIG. 6 is an enlarged portion of the airfoil illustrated in FIG. 3 having the damper in accordance with another embodiment.
Figure 7:
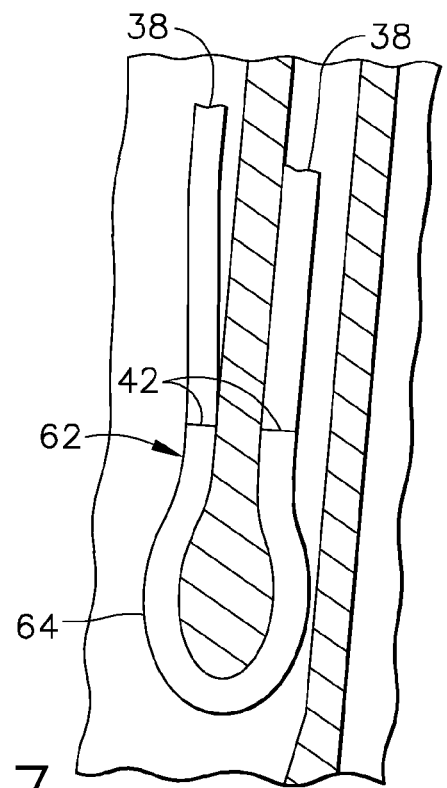
FIG. 7 is an enlarged sectional view of a portion of the airfoil illustrated in FIG. 6 with a modification of the damper therein.

FIGS. 6 and 7 illustrate two additional embodiments of the damper, designated 60,62, respectively, in which the fork 64 is bulbous and forms the damper inner part without a stem.

The bulbous fork 64 is trapped or supported on a corresponding partition of the blade for reducing centrifugal loads in the fork during operation. In FIG. 6, the inner end of the blade partition has a small circular supporting knob disposed within the larger fork 64, whereas in the FIG. 7 embodiment, the inner end of the partition has a relatively large knob conforming to the bulbous profile of the fork 64.

In both embodiments illustrated in FIGS. 6 and 7, the two joints 42 are located radially outwardly or above the two forks in relatively low load regions of the damper, with the outer rods 38 extending radially outwardly therefrom along opposite sides of the airfoil partition.

Yet again, the dampers illustrated in FIGS. 6 and 7 may selectively use the different first and second materials described above for the different outer and inner parts thereof for placing the wear resistant material in the frictional damping portion of the damper, and the high strength material in the load carrying portion of the dampers.

A significant advantage of the bimetallic damper disclosed above is the introduction of another design configuration addressing the different requirements of strength and wear. Wear resistance and strength in a single material are typically inversely related. A wear resistant material will have a relatively low tensile strength, whereas a high tensile strength material will have a relatively low wear resistance.

By preferentially introducing different materials in the different regions of the internal damper, a high strength material may be used in the regions of high load and stress for maximizing life, and a wear resistance material may be used in the areas subject to the high cycle frictional contact, which is typically a low load region.

The custom tailoring of material composition in the single damper may be used to provide enhanced low cycle fatigue life, high cycle fatigue life, and rupture life while also providing enhanced wear resistance in the portion of the damper experiencing frictional contact with the airfoil.

Since the wear resistant outer part of the damper extends radially through the airfoil, it is subject to higher heat loads than the supporting inner part of the damper. The outer part will therefore run hotter than the inner part which can be used for additional advantage for certain wear resistant alloys, such as the Cobalt-based example presented above, which create a natural lubricity upon reaching an elevated temperature during operation. This lubricity reduces wear, yet with effective damping performance.

Since internal dampers may be configured in various embodiments as disclosed above, they may be suitably modified in length or radial extent to introduce different materials over the outer and inner portions thereof. The inner portion of the damper supports the damper inside the turbine blade and is subject to high loading during operation. The high strength material may therefore be used in the supporting inner part.

In contrast, the damper outer portion is suspended from the inner portion inside the airfoil and may be formed of the different wear resistant material for maximizing life under frictional contact during operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desire to be secured by the Letters Patent of the United States is the invention as defined and differentiated in the following claims in which we claim:

1. A damper for a turbine blade including a hollow airfoil joined at a platform to a supporting dovetail, said damper comprising:
   an outer part sized to extend inside said airfoil from said platform;
   an inner part affixed to a proximal end of said outer part and extending therebelow for being retained in said blade below said platform; and
   said parts being formed of different materials for effecting frictional damping inside said airfoil and tensile support below said platform.

2. A damper according to claim 1 wherein said outer part comprises a first material having a greater frictional wear resistance than a different second material in said inner part.

3. A damper according to claim 2 wherein said second material in said inner part has a greater tensile strength than said first material in said outer part.

4. A damper according to claim 3 wherein said outer part is generally straight, and said inner part includes a bend.

5. A damper according to claim 4 wherein said outer and inner parts are coextensive and terminate at a mounting block at the proximal end of said inner part.

6. A damper according to claim 5 wherein said inner part bends laterally from said outer part below a joint therewith.

7. A damper according to claim 6 wherein said joint is disposed closer to said block than to the distal end of the said outer part.

8. A damper according to claim 4 further comprising a pair of said outer parts affixed at corresponding joints to a common fork in said inner part.

9. A damper according to claim 8 wherein said inner part further includes a stem integrally joined to said fork.

10. A damper according to claim 8 wherein said fork is stemless.

11. A turbine blade damper comprising a longitudinally elongate outer part formed of a first material affixed coextensively end-to-end to a longitudinally shorter inner part formed of a different second material.

12. A damper according to claim 11 wherein said outer part includes longitudinally opposite distal and proximal ends, and said proximal end is affixed to a distal end of said inner part at an integral joint therewith.

13. A damper according to claim 12 wherein said first material in said outer part has a greater frictional wear resistance than said second material in said inner part.

14. A damper according to claim 13 wherein said second material in said inner part has a greater tensile strength than said first material in said outer part.

15. A damper according to claim 14 wherein said outer part is generally straight, and said inner part includes a bend.

16. A damper according to claim 15 wherein said inner part terminates at a mounting block at the proximal end thereof.

17. A damper according to claim 16 wherein said inner part bends laterally from said outer part below said joint.

18. A damper according to claim 14 further comprising a pair of said outer parts affixed to a common inner part.

19. A damper according to claim 18 wherein said inner part includes a fork affixed to said pair of outer parts at corresponding joints between said first and second materials.

20. A damper according to claim 19 wherein said inner part further includes a stem integrally joined to said fork.

21. A damper according to claim 19 wherein said fork is stemless.

22. A damper according to claim 19 wherein said fork has straight legs joined to said outer parts.

23. A damper according to claim 19 wherein said fork is bulbous.

24. A method of making said damper according to claim 14 comprising:
    forming said outer part in said first material;
    forming said inner part in said second material; and
    bonding said outer and inner parts at said integral joint therebetween to form a unitary damper.

25. A method according to claim 24 further comprising:
    firstly casting said parts and secondly bonding together said cast parts; and
    machining excess material from said parts to form said damper.

26. A method according to claim 25 further comprising hot forming said bonded parts to bend said inner part.

27. A turbine blade stick damper comprising an outer rod joined longitudinally end-to-end with a supporting inner shank with correspondingly different adjoining materials.

* * * * *